United States Patent [19]

Hyun et al.

[11] Patent Number: 5,751,468
[45] Date of Patent: May 12, 1998

[54] VERTICAL MODULATOR WITH DUAL MODE DBR

[75] Inventors: Kyung-Sook Hyun, Yusong-ku; O-Kyun Kwon, Seo-ku; Kwang-Joon Kim; El-Hang Lee, both of Yusong-ku, all of Rep. of Korea

[73] Assignee: Electronics and Telecommunications Research Center, Daejeon, Rep. of Korea

[21] Appl. No.: 717,127

[22] Filed: Sep. 20, 1996

[30] Foreign Application Priority Data

Dec. 20, 1995 [KR] Rep. of Korea ............. 95-52644

[51] Int. Cl.⁶ ..................................... G02F 1/09
[52] U.S. Cl. .................. 359/282; 356/350; 359/359; 359/360
[58] Field of Search ........................... 359/282, 295, 359/246, 281; 356/350; 257/24

[56] References Cited

U.S. PATENT DOCUMENTS

| | | |
|---|---|---|
| 3,851,973 | 12/1974 | Macek .............................. 359/282 |
| 4,637,953 | 1/1987 | Sawamura et al. ................ 359/282 |
| 4,968,136 | 11/1990 | Lim et al. ......................... 359/282 |
| 4,983,025 | 1/1991 | Umemura .......................... 359/282 |
| 5,153,688 | 10/1992 | Oda et al. ......................... 359/282 |
| 5,336,965 | 8/1994 | Meyer et al. ...................... 359/359 |
| 5,508,091 | 4/1996 | Austin .............................. 359/359 |

*Primary Examiner*—Loha Ben
*Attorney, Agent, or Firm*—Nixon & Vanderhye P.C.

[57] ABSTRACT

A vertical modulator with a dual mode distributed Bragg reflection (DBR), includes a pair of integrated elements using different wavelengths to provide functions of logical operation, data switching and wavelength conversion. The optical device includes a first optical structure operating at a first wavelength ($\lambda_1$) and a second optical structure operating at a second wavelength ($\lambda_2$). The first and second optical structures are formed over a semiconductor substrate. The first optical structure, which operates at the first wavelength ($\lambda_1$), transmits its data to the second optical structure so that data corresponding to the second wavelength ($\lambda_2$) can be output. Since the wavelength of input light is different from the wavelength of output light, the optical device serves as a modulator which performs a logic operation and switching function while carrying out wavelength conversion.

4 Claims, 6 Drawing Sheets

2 TIMES

FIG. 3a(2)

4 TIMES

FIG. 3a(3)

6 TIMES

FIG. 3b(1) 5 TIMES

FIG. 3b(2) 7 TIMES

FIG. 3b(3) 10 TIMES

VERTICAL MODULATOR WITH DUAL MODE DBR

BACKGROUND OF THE INVENTION

1. Field of the Invention

The present invention relates to an optical device, and more particularly to a vertical modulator with dual mode distributed Bragg reflection (DBR) which includes a pair of integrated elements using different wavelengths to provide functions of logical operation, switching and wavelength conversion.

2. Description of the Prior Art

Recent increases in amount of communication data have resulted in a demand for ultra-high speed data communication systems with large capacity. In accordance with such demand, communications using light have been developed over the last few years.

Data transmission using light has been researched in various technical fields for various purposes. As a result, a variety of wavelengths have also been used in such data transmission.

Where optical signals are used as a medium for transmitting data, light having a wavelength of 1.3 μm or 1.55 μm is typically used. At wavelengths of 1.3 μm or 1.55 μm, the Rayleigh scattering and loss of light caused by light absorption can be minimized. On the other hand, the optical interconnection required to input the transmitted optical signals at an optical computer corresponds to a short-distance optical signal transmission.

In such an optical inter- connection, accordingly, it is unnecessary to take into consideration loss of light resulting from long-distance transmission. In this regard, optical devices used for the above-mentioned optical interconnection are made of materials utilizing a short-wave length and exhibiting an integration degree higher than of utilizing the above-mentioned wavelength, namely, 1.3 μm or 1.55 μm. As such a short-wave length material, GaAs/AlGaAs (850 nm) or GaAs/InGaAs (980 nm) is mainly used.

In the case of using optical devices having different wavelengths as mentioned above, however, another device should also be used for data switching between the optical devices of different wavelengths in order to convert input light to the form of electrical current and then to convert that back into light with a wavelength different from that of the input light. As a result, there is an inconvenience.

Meanwhile, there has been a lot of development in the integration of optical devices using different wavelengths. However, all known methods are associated with simple integration. For this reason, there is a problem in that a logic operation or switching between two different wavelengths can not be achieved.

SUMMARY OF THE INVENTION

Therefore, an object of the invention is to provide a vertical modulator with dual mode DBR, which includes a pair of integrated elements using different wavelengths to have functions of logical operation, data switching and wavelength conversion.

In accordance with one aspect, the present invention provides a vertical modulator with dual mode distributed Bragg reflection, comprising: a first-conduction type semiconductor substrate; a first optical structure operating at a first wavelength, the first optical structure including a first-conduction type electrode formed over the first-conduction type semiconductor substrate, an optically active layer formed over the first-conduction type electrode and adapted to serve as a multiple quantum well layer, and a second-conduction type electrode formed over the optically active layer; a mirror structure formed over the first optical structure, the mirror structure exhibiting a high reflection factor at either the first wavelength or a second wavelength different from the first wavelength; a second optical structure operating at the second wavelength, the second optical structure including a first-conduction type electrode formed over the first-conduction type semiconductor substrate, an optically active layer formed over the first-conduction type electrode and adapted to serve as a multiple quantum well layer, and a second-conduction type semiconductor electrode layer formed over the optically active layer; a first ohmic electrode adapted to connect the first-conduction type substrate and the first-conduction type electrode of the second optical structure with each other; a second ohmic electrode adapted to connect the second-conduction type electrode of the first optical structure and the second-conduction type semiconductor electrode layer; an anti-reflection film for the second optical structure; another anti-reflection film for the first optical structure; and a metal layer adapted to connect the second-conduction type electrode and the first-conduction type electrode.

In accordance with another aspect, the present invention provides a vertical modulator with dual mode distributed Bragg reflection, comprising: a first-conduction type semiconductor substrate; a first optical semiconductor structure operating at a first wavelength, the first optical structure including a first-conduction type electrode formed over the first-conduction type semiconductor substrate, an optically active layer formed over the first-conduction type electrode and adapted to serve as a multiple quantum well layer, and a second-conduction type electrode formed over the optically active layer; a mirror structure formed over the first optical structure, the mirror structure exhibiting a high reflection factor at either the first wavelength or a second wavelength different from the first wavelength; a second optical structure operating at the second wavelength, the second optical structure including a first-conduction type electrode formed over the first-conduction type semiconductor substrate, an optically active layer formed over the first-conduction type electrode and adapted to serve as a multiple quantum well layer, and a second-conduction type semiconductor electrode layer formed over the optically active layer; a first ohmic electrode adapted to connect the first-conduction type substrate and the first-conduction type electrode of the second optical structure with each other; a second ohmic electrode adapted to connect the second-conduction type electrode of the first optical structure and the second-conduction type semiconductor electrode layer; and a resonating structure comprised of a metal layer adapted to connect the second-conduction type electrode and the first-conduction type electrode.

BRIEF DESCRIPTION OF THE DRAWINGS

Other objects and aspects of the invention will become apparent from the following description of embodiments with reference to the accompanying drawings in which:

FIGS. 3a(1)–3a(3) and 3b(1) 3b(3) are graphs respectively depicting a variation in reflection factor depending on a variation in wavelength in the mirror structure of FIG. 2 including unit mirror layers laminated several times, repetitively, wherein FIGS. 3a(1)–3a(3) illustrates variations in reflection factor in mirror structures respectively formed by laminating unit mirror layers (each consisting of 14 films) 2 times, 4 times and 6 times in order to simultaneously obtain high reflection factors at wavelengths of 980 nm and 850 nm using GaAs/AlAs, and FIGS. 3b(1)–3b(3) illustrate variations in reflection factor in mirror structures respectively formed by laminating unit mirror layers (each consisting of 5 films) 5 times, 7 times and 10 times in order to simultaneously obtain high reflection factors at wavelengths of 980 nm and 850 nm using GaAs/AlAs;

DETAILED DESCRIPTION OF THE PREFERRED EMBODIMENTS

Figure 1:
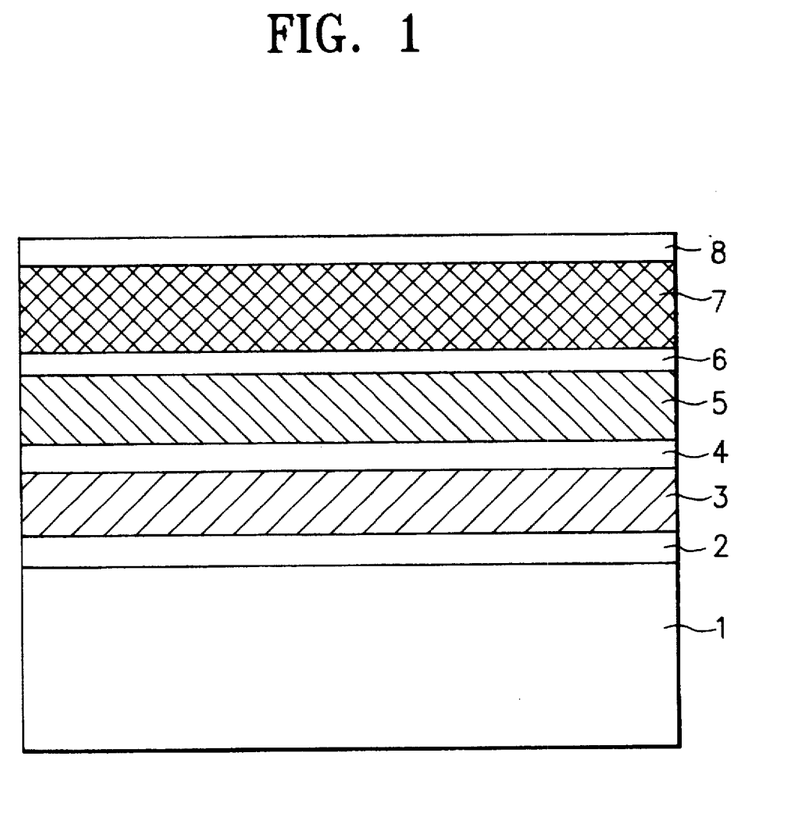
FIG. 1 is a sectional view illustrating a multilayer semiconductor structure including two integrated optical elements using different wavelengths in accordance with the present invention.

FIG. 1 is a sectional view illustrating a multilayer semiconductor structure including two integrated optical elements using different wavelengths in accordance with the present invention.

As shown in FIG. 1, the semiconductor structure includes a first-conduction type substrate 1 and a plurality of layers sequentially laminated over the substrate 1. The layers laminated over the substrate 1 include a first-conduction type semiconductor electrode layer 2, an optically active layer 3 having an operating wavelength corresponding to a first wavelength $\lambda_1$, and a second-conduction type semiconductor electrode layer 4. By virtue of such layers, the semiconductor structure can obtain an effect of absorbing electric light. In other words, the semiconductor structure can transmit light having the first wavelength $\lambda_1$ therethrough. The optically active layer 3 serves as a multiple quantum well for the first wavelength $\lambda_1$. This semiconductor structure is fabricated without etching the semiconductor substrate.

Over the second-conduction type semiconductor electrode layer 4, a semiconductor mirror layer 5 is formed which exhibits a high reflection factor of at least 95% with regard to either light of the first wavelength $\lambda_1$ or light of a second wavelength $\lambda_2$ different from the first wavelength $\lambda_1$.

The semiconductor structure also includes a plurality of layers sequentially laminated over the semiconductor mirror layer 5. The layers laminated over the semiconductor mirror layer 5 include a first-conduction type semiconductor electrode layer 6, an optically active layer 7 having an operating wavelength corresponding to the second wavelength $\lambda_2$, and a second-conduction type semiconductor electrode layer 8. By virtue of such layers, the semiconductor structure can transmit light having the second wavelength $\lambda_2$ therethrough. The optically active layer 7 serves as a multiple quantum well for the first wavelength $\lambda_1$.

Figure 2:
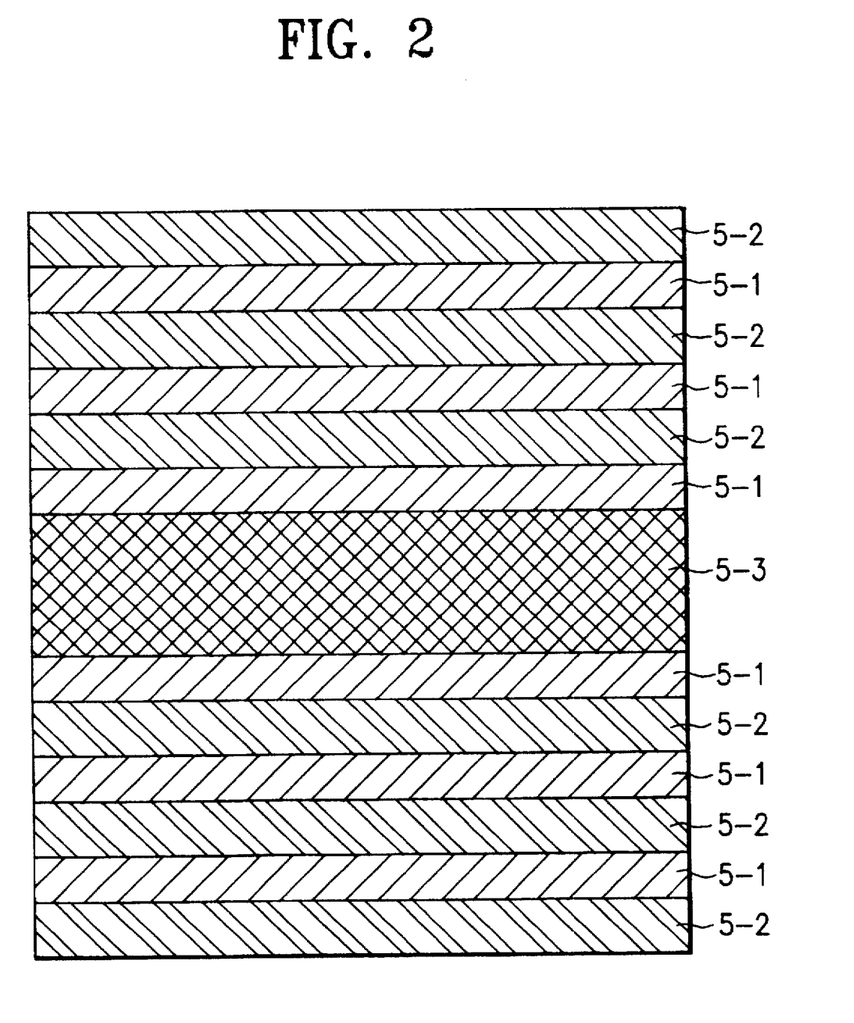
FIG. 2 is a sectional view illustrating a detailed structure of the semiconductor mirror layer of FIG. 1 in accordance with the present invention.

The semiconductor mirror structure is formed by laminating two semiconductor films 5-1 and 5-2 exhibiting a high refraction index several times. Each laminated semiconductor film has a thickness of $\lambda/4n$.

In order to obtain a high reflection factor, the phase difference of light expressed by "$-e^{(-2ikd)}$" should be appropriately determined. That is, the real number term of "$-e^{(-2ikd)}$" should have a maximum value. Namely, "$-\cos(2kd)$" should correspond to 1. Accordingly, "2kd" of the "cos(2kd)" should correspond to $\pi$. In this case, light reflecting on each reflecting film has a phase difference of $\pi$ from the incident angle of the incident light on the film, so that it may interfere with the incident light. As a result, the amount of light absorbed in each reflecting film is minimized. The reflecting films exhibit a high reflection factor in the vicinity of a particular wavelength.

The present invention is intended to enable the single mirror to obtain high reflection factors with regard to two light beams with different wavelengths. In accordance with the present invention, therefore, the phase difference between the first and second wavelengths $\lambda_1$ and $\lambda_2$ is determined to be "$-(e^{(-2ik1d)}+e^{(-2ik2d)})$".

Where the above-mentioned principle is applied to two different wavelengths, the following condition should be satisfied:

$$-(\cos(2k_1d)+\cos(2k_2d))=-2\cos(2k_0d)\cos(2\Delta kd)=1$$

where, $$k_0 = \frac{(k_1+k_2)}{2}, \quad \Delta k = \frac{(k_1-k_2)}{2}$$

"$\lambda$" and "k" have a relationship of "$k=2\pi/\lambda$".

In "$2\cos(2k_0d)\cos(2\Delta kd)$" of the above expression, its preceding term is modulated at a speed higher than that of its following term. When it is desired to carry out the cosine modulation of the following term in a square modulation manner, a film having a thickness of $\lambda/4n$ is interposed between appropriate films of the mirror layer. In this case, reflecting light beams have a phase difference of 180°. In FIG. 2, such a film is denoted by the reference numeral "5-3".

$\lambda_0$ corresponds to $2\lambda_1\lambda_2/(\lambda_1+\lambda_2)$ whereas $\Delta\lambda$ corresponds to "$2\lambda_1\lambda_2/(\lambda_2-\lambda_1)$". On the other hand, $\lambda_0/\Delta\lambda$ corresponds to $(\lambda_1+\lambda_2)/(\lambda_2-\lambda_1)$. The value represents a unit mirror layer. Accordingly, one unit mirror layer can be derived by deriving $\lambda_0$ and $\Delta\lambda$.

FIG. 2 is a sectional view concretely showing the semiconductor mirror layer 5 of FIG. 1. In the case of a mirror comprised of such a semiconductor mirror layer, which exhibits a high reflection factor at wavelengths of 850 nm and 980 nm, $\lambda_0$ is 910 nm whereas $\lambda_0/\Delta\lambda$ is 14.1. When $\lambda_0/\Delta\lambda$ is approximated to 14, one unit mirror consists of 14 laminated films each having a thickness of $\lambda/4n$.

Figure 3A:
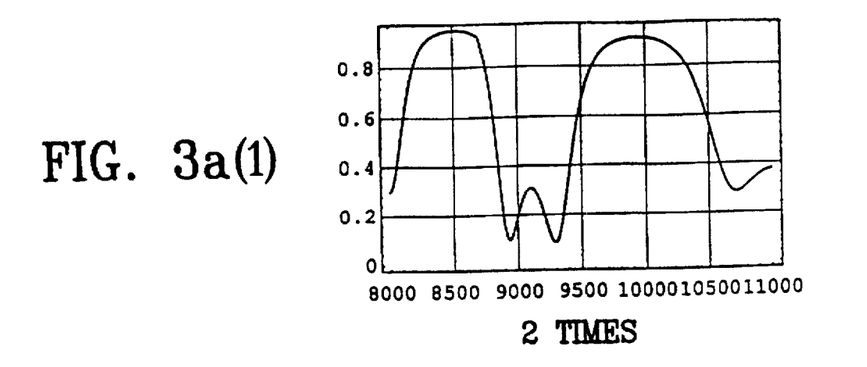
Figure 3B:
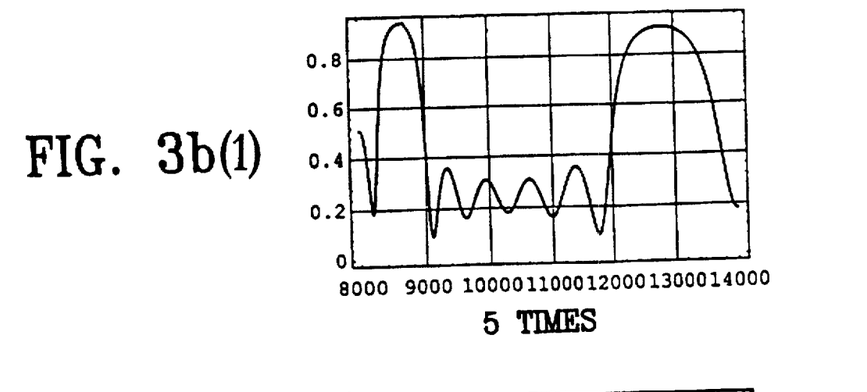

FIGS. 3a and 3b are graphs respectively depicting a variation in reflection factor depending on a variation in wavelength in a mirror structure including unit mirror layers laminated several times, repetitively. The reflection factor is measured through a computer simulation. In each graph, the horizontal axis corresponds to wavelength whereas the vertical axis corresponds to reflection factor.

Referring to FIGS. 3a(1)–3a(3) and 3b(1)–3b(3), it can be found that the reflection factor approximates to 1 as the number of repetition times increases.

FIGS. 3a(1)–3a(3) illustrate variations in reflection factor in mirror structures respectively formed by laminating unit mirror layers (each consisting of 14 films) 2 times, 4 times and 6 times in order to simultaneously obtain high reflection factors at wavelengths of 980 nm and 850 nm using GaAs/ AlAs. On the other hand, FIG. 3b(1)–3b(3) illustrate variations in reflection factor in mirror structures respectively formed by laminating unit mirror layers (each consisting of 5 films) 5 times, 7 times and 10 times in order to simultaneously obtain high reflection factors at wavelengths of 980 nm and 850 nm using GaAs/AlAs.

Now, an embodiment of the present invention will be described, wherein a multilayer semiconductor structure including two integrated elements using wavelengths $\lambda_1$ (980 nm) and $\lambda_2$ (850 nm) is fabricated. In accordance with the embodiment of the present invention, the first optical structure consisting of the layers 2, 3 and 4 has a p-i-n structure. The i-layer 3 is an InGaAs/GaAs multiple quantum well layer for the wavelength of 980 nm. The second optical structure consisting of the layers 6, 7 and 8 also has a p-i-n structure. The i-layer 7 is an AlGaAs/GaAs multiple quantum well layer for the wavelength of 850 nm. On the other hand, the mirror structure 5 includes a plurality of unit semiconductor mirror layers each consisting of films 5-1 and 5-2 so that it can exhibit a high reflection factor of at least 95% with regard to either $\lambda_1$ (980 nm) or $\lambda_2$ (850 nm). In accordance with this embodiment of the present invention, the film 5-1 is comprised of a GaAs film whereas the film 5-2 is comprised of an AlAs film. Each film has a thickness of $\lambda_0/4$. As the intermediate film 5-3 providing a phase delay of 180°, a layer having a thickness of $X_0/4$ is interposed in the middle portion of the mirror structure 5.

Figure 4:
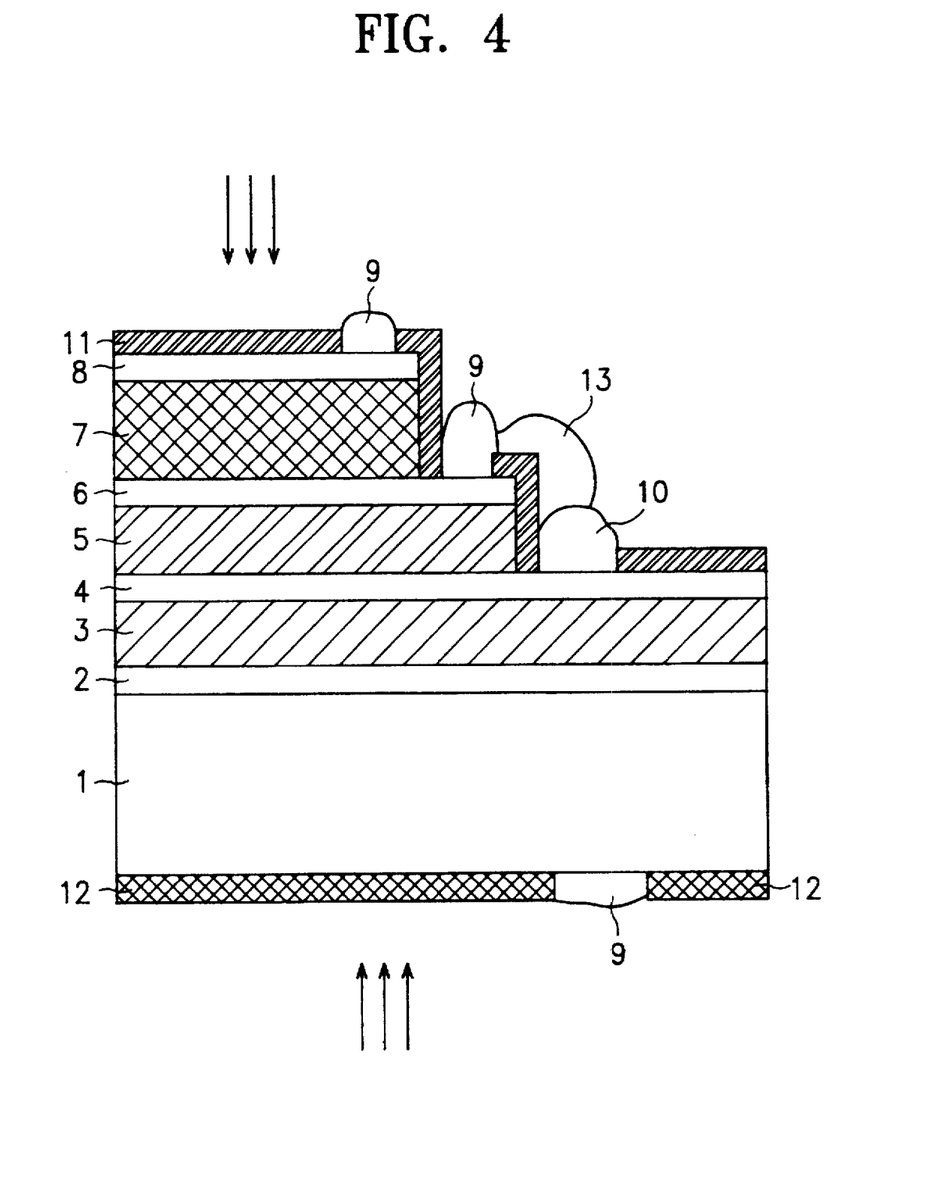
FIG. 4 is a sectional view illustrating a vertical modulator with a dual DBR as an integrated logic device operating at two different wavelengths, which uses the multilayer semiconductor structure of FIG. 1 as a unit structure for performing an optical modulation function.

FIG. 4 illustrates a vertical modulator with a dual DBR as an integrated logic device operating at two different wavelengths, which uses the multilayer semiconductor structure of FIG. 1 as a unit structure for performing an optical modulation function. This logic device includes a pair of diodes respectively constituted by the optical structures of FIG. 1. In order to connect the pin diodes in series, ohmic metal electrode layers 9, 13 and 10 are also provided.

In other words, the ohmic metal electrode layers 9 and 10 provide an electrical interconnection of the semiconductor structure to obtain functions such as logic operation, switching and modulation. The ohmic metal electrode layer 9 serves to electrically connect the first-conduction type semiconductor 1 and the first-conduction type electrode layer 6 with each other whereas the ohmic metal electrode layer 10 serves to electrically connect the second-conduction type electrode layer 4 and the second-conduction type electrode layer 8 with each other.

In FIG. 4, the reference numeral 11 denotes an anti-reflection film for the second optical structure, and the reference numeral 12 denotes an anti-reflection film for the first optical structure. The anti-reflection film 11 is formed over the exposed surface of the second-conduction type semiconductor electrode layer 8 whereas the anti-reflection film 12 is formed over the exposed surface of the first-conduction type semiconductor substrate 1.

As the PIN diodes are connected to each other in series or in parallel, they can switch information.

Where the diodes are connected to each other in series, they share stable voltage. In this case, the level of voltage applied across each diode can be adjusted using light. In other words, the diodes may form an optically bistable device.

When a writing beam having a first wavelength is incident on one diode, namely, the first diode, a reading beam having a second wavelength is incident on the other diode, namely, the second diode. Accordingly, the information written in the first diode is output from the second diode in the form of light with the second wavelength. In this case, beams respectively having the first and second wavelengths are reflected by the intermediate mirror structure. As a result, the intermediate mirror structure serves to not only increase the absorption of light, but also to prevent the beams of the different wavelengths from interfering with each other.

This optical device can be applied to well-known circuits, for example, an S-SEED. In this regard, it is possible to realize an optical device having a logic operation and switching function enabling wavelength conversion.

Figure 5:
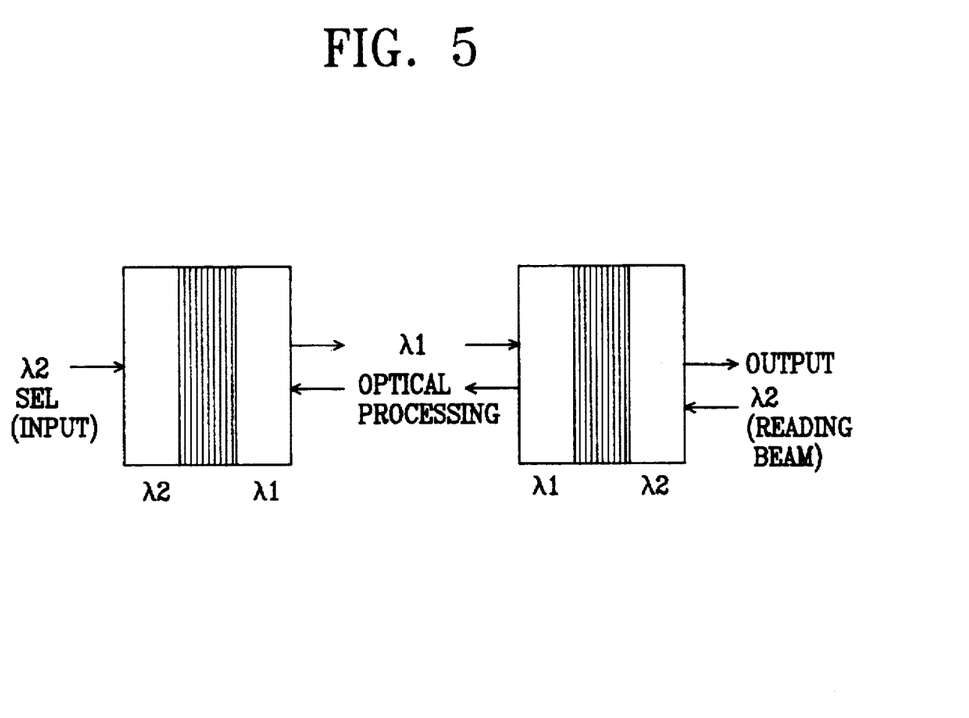
FIG. 5 is a schematic view illustrating a data communication system constructed using optical devices each having the structure of FIG. 4.

FIG. 5 illustrates a data communication system constructed using optical devices each having the structure of FIG. 4.

Referring to FIG. 5, a pair of optical devices each having the structure of FIG. 4 are vertically arranged. Between the optical devices, free-space optical data processing is carried out using the first wavelength $\lambda_1$. Long-distance communication of input and output optical signals is carried out using the second wavelength $X_2$. In other words, it is possible to realize a system which achieves optical processing and interconnection using light with $\lambda_1$, long-distance communication using light with $\lambda$, and data processing using light with a wavelength different from $\lambda_2$.

As apparent from the above description, the present invention provides an optical modulator with a new concept using a semiconductor mirror structure exhibiting high reflection factors respectively with respect to two different wavelengths. Accordingly, the present invention greatly expands the application range of optical modulators.

Using the inventive optical modulator, it is possible to fabricate an integrated device capable of achieving easy data switching in a wide range of wavelengths. Accordingly, the optical modulator is very useful in technical fields including optical switching, optical communication and optical interconnection.

Known optical devices, for example, surface emitting lasers, self electro-optic devices or GaAs-based laser diodes operate at various wavelengths with a wavelength difference ranging from several tens of Angstroms to several thousands of Angstroms.

For example, in accordance with the present invention, it is possible to realize a communication system capable of achieving data processing using light with an optional wavelength by directly connecting a communication wavelength, which may be 1.3 µm or 1.55 µm, to an optical device having a GaAs/AlGaAs structure operating at a wavelength of 0.85 µm and an InGaAs/GaAs structure operating at a wavelength of 0.98 µm.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A vertical modulator with a dual mode distributed Bragg reflection, comprising:
 a first-conduction type semiconductor substrate;
 a first optical structure operating at a first wavelength, the first optical structure including a first-conduction type electrode formed over the first-conduction type semiconductor substrate, an optically active layer formed over the first-conduction type electrode and adapted to serve as a multiple quantum well layer, and a second-conduction type electrode formed over the optically active layer;
 a mirror structure formed over the first optical structure, the mirror structure exhibiting a high reflection factor at either the first wavelength or a second wavelength different from the first wavelength;

a second optical structure operating at the second wavelength, the second optical structure including a first-conduction type electrode formed over the mirror structure, an optically active layer formed over the first-conduction type electrode and adapted to serve as a multiple quantum well layer, and a second-conduction type semiconductor electrode formed over the optically active layer;

a first ohmic electrode adapted to connect the first-conduction type substrate and the first-conduction type electrode of the second optical structure with each other;

a second ohmic electrode adapted to connect the second-conduction type electrode of the first optical structure and the second-conduction type semiconductor electrode;

an anti-reflection film for the second optical structure;

another anti-reflection film for the first optical structure; and a metal layer adapted to connect the second-conduction type electrode and the first-conduction type electrode.

2. The vertical modulator in accordance with claim 1, wherein the first-conduction type electrodes and the first-conduction type semiconductor substrate are an N type and the second-conduction type electrodes are a P type.

3. The vertical modulator in accordance with claim 1, wherein the first-conduction type electrodes and the first-conduction type semiconductor substrate are a P type and the second-conduction type electrodes are an N type.

4. A vertical modulator with a dual mode distributed Bragg reflection, comprising:

a first-conduction type semiconductor substrate;

a first optical structure operating at a first wavelength, the first optical structure including a first-conduction type electrode formed over the first-conduction type semiconductor substrate, an optically active layer formed over the first-conduction type electrode and adapted to serve as a multiple quantum well layer, and a second-conduction type electrode formed over the optically active layer;

a mirror structure formed over the first optical structure, the mirror structure exhibiting a high reflection factor at either the first wavelength or a second wavelength different from the first wavelength;

a second optical structure operating at the second wavelength, the second optical structure including a first-conduction type electrode formed over the mirror structure, an optically active layer formed over the first-conduction type electrode and adapted to serve as a multiple quantum well layer, and a second-conduction type semiconductor electrode layer formed over the optically active layer;

a first ohmic electrode adapted to connect the first-conduction type substrate and the first-conduction type electrode of the second optical structure with each other;

a second ohmic electrode adapted to connect the second-conduction type electrode of the first optical structure and the second-conduction type semiconductor electrode layer; and a resonating structure comprised of a metal layer adapted to connect the second-conduction type electrode and the first-conduction type electrode.

* * * * *